US007614368B2

United States Patent
Gehres et al.

(10) Patent No.: US 7,614,368 B2
(45) Date of Patent: Nov. 10, 2009

(54) AUTOMATED NO-IDLE HEATING AND ENGINE PRE-HEAT USING ENGINE COOLANT

(75) Inventors: Michelle R. Gehres, Convoy, OH (US); Kenneth J. Smith, Black Hawk, SD (US); Joaquin J. Hernandez, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/949,108

(22) Filed: Dec. 3, 2007

(65) Prior Publication Data

US 2009/0139472 A1     Jun. 4, 2009

(51) Int. Cl.
    *F01P 7/16* (2006.01)
(52) U.S. Cl. .............................. 123/41.08; 237/12.3 R; 165/42; 165/43; 62/185
(58) Field of Classification Search .............. 123/41.29, 123/41.31, 41.44, 41.51, 142.5 R, 550, 551; 237/12.3 R, 12.3 B, 2 A; 165/42, 43
See application file for complete search history.

(56) References Cited

U.S. PATENT DOCUMENTS

| | | | |
|---|---|---|---|
| 4,732,229 A * | 3/1988 | Lucht | 180/69.6 |
| 4,825,663 A * | 5/1989 | Nijjar et al. | 62/236 |
| RE33,687 E * | 9/1991 | Greer | 165/43 |
| 5,333,678 A | 8/1994 | Mellum et al. | |
| 5,901,780 A | 5/1999 | Zeigler et al. | |
| 6,932,148 B1 * | 8/2005 | Brummett et al. | 165/43 |
| 7,150,159 B1 * | 12/2006 | Brummett et al. | 62/236 |
| 7,237,397 B2 * | 7/2007 | Allen | 62/236 |
| 7,259,469 B2 * | 8/2007 | Brummett et al. | 290/40 C |
| 7,316,119 B2 * | 1/2008 | Allen | 62/236 |
| 7,350,368 B2 * | 4/2008 | Heberle et al. | 62/196.4 |
| 7,456,136 B2 * | 11/2008 | Moreton et al. | 508/460 |
| 2005/0138942 A1 * | 6/2005 | Grimm et al. | 62/180 |
| 2006/0042285 A1 * | 3/2006 | Heberle et al. | 62/236 |
| 2007/0063062 A1 | 3/2007 | Hernandez et al. | |

* cited by examiner

*Primary Examiner*—Michael Cuff
*Assistant Examiner*—Hung Q Nguyen
(74) *Attorney, Agent, or Firm*—Jeffrey P. Calfa; Mark C. Bach

(57) ABSTRACT

To avoid engine idling to support cabin heating, an auxiliary coolant heater can heat engine coolant and pump it through compartment heaters or the engine cooling system. The coolant flow control system provides great flexibility in selectively distributing heated coolant for heating and engine pre-heating.

12 Claims, 2 Drawing Sheets

000# AUTOMATED NO-IDLE HEATING AND ENGINE PRE-HEAT USING ENGINE COOLANT

FIELD OF THE INVENTION

This invention relates to motor vehicles, such as highway trucks, that are powered by liquid-cooled combustion engines, and that have auxiliary coolant heaters for heating engine coolant when the primary engine is off and which provide for circulating the heated coolant from the auxiliary coolant heaters to the engines for engine pre-heating and to occupant compartment heat exchangers for occupant compartment heating.

BACKGROUND OF THE INVENTION

Cooling systems for liquid-cooled internal combustion engines conventionally comprise an engine driven pump for circulating the coolant through the cooling system and a radiator which serves to sink heat from the system to the environment. For engines and engine cooling systems used on a motor vehicle some of this heat may be diverted to the motor vehicle's passenger compartment during cool weather to heat the compartment for the comfort of the occupants. A heat exchanger or "core" through which coolant may be selectively circulated from the engine cooling system provides a way to divert engine heat to the cab for the comfort of the occupants.

Certain motor vehicles, such as large trucks, have occupant compartments (cabs) that include a driver's compartment and a sleeper compartment behind the driver's compartment for use by the driver when not on duty or by a relief driver. It has been expedient in some applications to provide a second core or heat exchanger in the sleeper compartment to better distribute heat through the cab. In the past truck drivers often left the vehicle's main engine running at idle to provide heated coolant for circulation to the passenger and sleeper compartment cores to provide cold weather heating while the vehicle was parked. This had the secondary benefit of keeping the engine warm and avoiding the need for cold restarts, which are notoriously difficult on compression ignition engines. It was also widely recognized that this practice wasted fuel and contributed unnecessarily to air pollution because internal combustion engines running at idle expend too much energy overcoming the engine's parasitic losses for the amount of useful heat produced. As a result the practice of idling a vehicle's primary engine for extended periods to provide heating (or energy for cooling) has been prohibited in many areas.

However, providing climate control on board parked vehicles and pre-heating engines for easier cold weather starts remain valid concerns. Accordingly the art teaches the use of on-board auxiliary coolant heaters which can provide ample heat for these functions without running the engine and incurring the engine's parasitic losses. This is sometimes referred to as "no-idle" heating. One brand of commercially available heaters offers sizes whose heat output range from 5,500 BTU to 120,000 BTU and can run on the gasoline or diesel fuel that is carried by the vehicle. Examples of patents describing similar systems, or related approaches, include U.S. Pat. No. 5,333,678 (describing an auxiliary engine which has sufficient capacity to efficiently run an air conditioner compressor or an electric generator) and U.S. Pat. No. 5,901,780 (a no-idle system). Also of interest is U.S. Patent Application Publication 2007/0063062 for a no-idle system, which is assigned to the assignee of the present application and incorporated herein by reference.

A typical auxiliary coolant heater is reasonably compact and contains components necessary to heat (a burner) and circulate (a pump) engine coolant while the engine is off. The heater may provide heat at different selectable levels, and may be under the control of an associated control unit to maintain a set temperature. When occupant compartment heating is called for, a coolant pump starts circulating coolant through a heat exchanger. A heating device heats the coolant as it circulates so that heated coolant flows out of the heater.

SUMMARY OF THE INVENTION

The present invention relates to a coolant circuit for a motor vehicle which provides for selective circulation of coolant through an on-board auxiliary coolant heater, a primary (main cabin) heater core, at least a first secondary or auxiliary (sleeper compartment) heater core, an engine cooling system, or to selected combinations of these elements. Valves are distributed through the coolant circuit allowing the selective isolation from the circuit of selected sections of the coolant circuit. A coolant flow controller, which is preferably integrated with a controller programmed for handling cabin environmental control, has control over the auxiliary coolant heater (and its attendant auxiliary pump) and the positions of the various valves. For environmental controller the flow controller may be connected to sensors providing temperature indications for the various sections of the cabin as well as coolant temperature. The coolant flow controller is coupled to receive indication of main engine operation, which will determine whether an engine coolant pump is operating.

The possible combinations of circulation flow routes are determined to some extent on the operating state of the heat sources. Four states are contemplated: (1) auxiliary heater running and providing heat to pre-heat main engine which is off; (2) main engine off with auxiliary heater running to provide cabin heat; (3) main engine and auxiliary heater running; and (4) main engine on and auxiliary heater off. In state (1) the various valves are set to cut off flow to the main and auxiliary cabin heating cores but to allow circulation through the engine cooling system. In state (2) the valves controlling flow to the cabin heater cores are "modulated", that is opened and closed in alternating fashion, to provide flow through the auxiliary and main heater cores to maintain the desired temperature in the passenger cabin. In some embodiments the valve for the main heater core may simply be closed and temperature control implemented through the auxiliary core. The valve controlling flow through the engine cooling path is also modulated to maintain engine temperature at a minimum threshold. Coolant is reverse circulated through the cores. In state (3) the engine is on but coolant temperature is measured to be below a desired minimum threshold, and as a consequence the auxiliary heater remains on. Here valves are set to isolate the engine cooling circuit from the cabin heating circuit and the auxiliary heater provides all the heat available for the front and rear auxiliary cores. Isolation of the two sub-circuits from one another prevents the engine coolant pump from damaging the auxiliary pump, both of which will be running. Coolant is reverse circulated through the cores. In state (4) the engine is on and coolant temperature in the engine coolant system sub-circuit is sufficiently high to support heating of the cabin. The valve to the auxiliary heater will be closed and the valves to the front and auxiliary cores modulated as required by temperature settings. A default state (5) may be inferred in which the engine is off and the auxiliary heater is off. It is conceivable here that the auxiliary pump may be operated and the valves set to promote flushing or cleaning of the circulation system without operation of the engine.

The foregoing, along with further features and advantages of the invention, will be seen in the following disclosure of a presently preferred embodiment of the invention depicting the best mode contemplated at this time for carrying out the invention. This specification includes a drawing, now briefly described as follows.

DESCRIPTION OF THE PREFERRED EMBODIMENT

Figure 1:
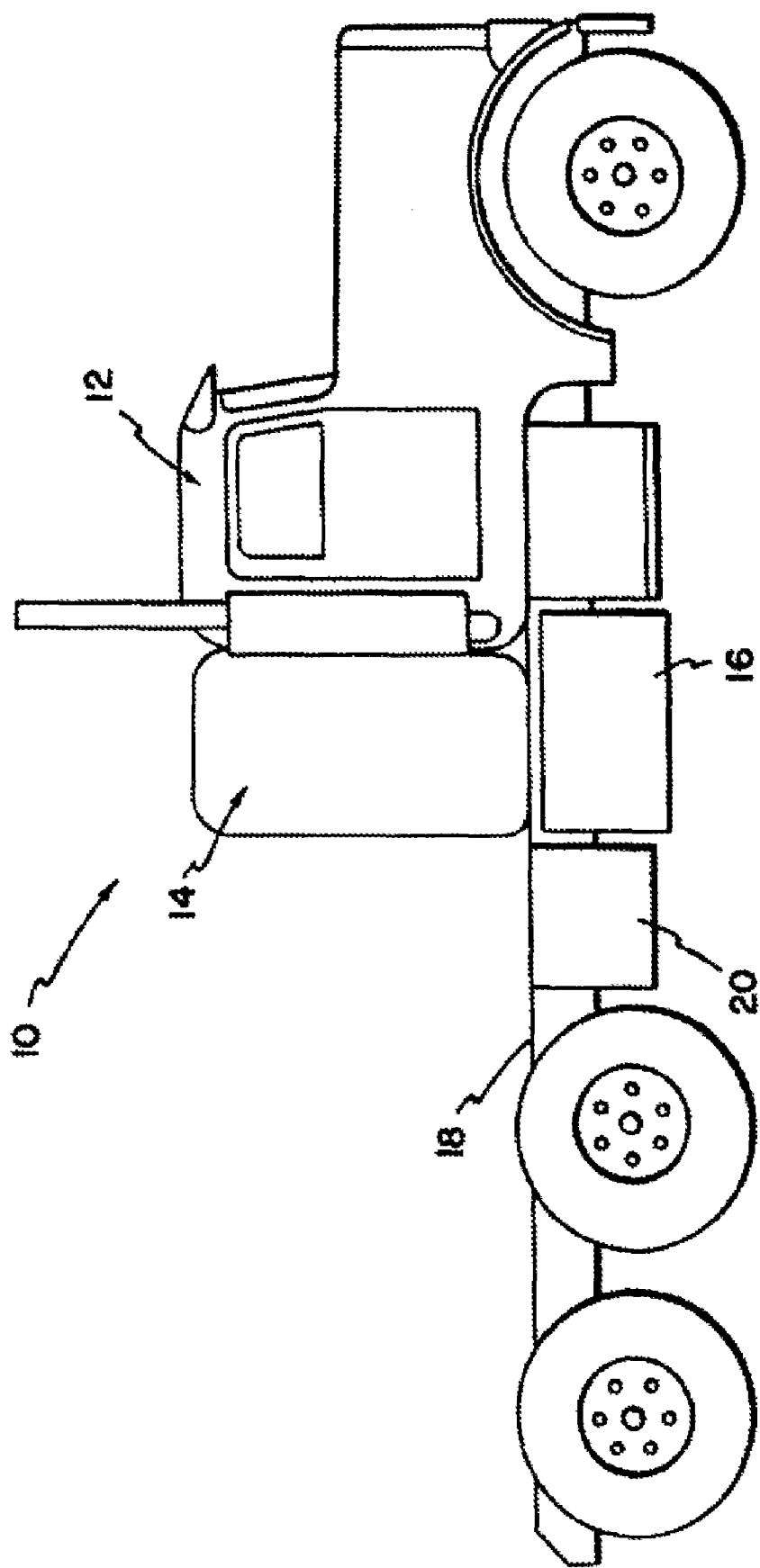
FIG. 1 is a side view of a truck with a sleeper cab and an auxiliary heating unit.

FIG. 1 shows a truck 10 equipped with an auxiliary heating unit 20 for supplying heated coolant to heat exchangers installed in a driver's cab 12 and a sleep compartment 14. Auxiliary heating unit 20 uses fuel from a vehicle fuel tank 16 and is mounted with the fuel tank on the truck chassis 18.

Figure 2:
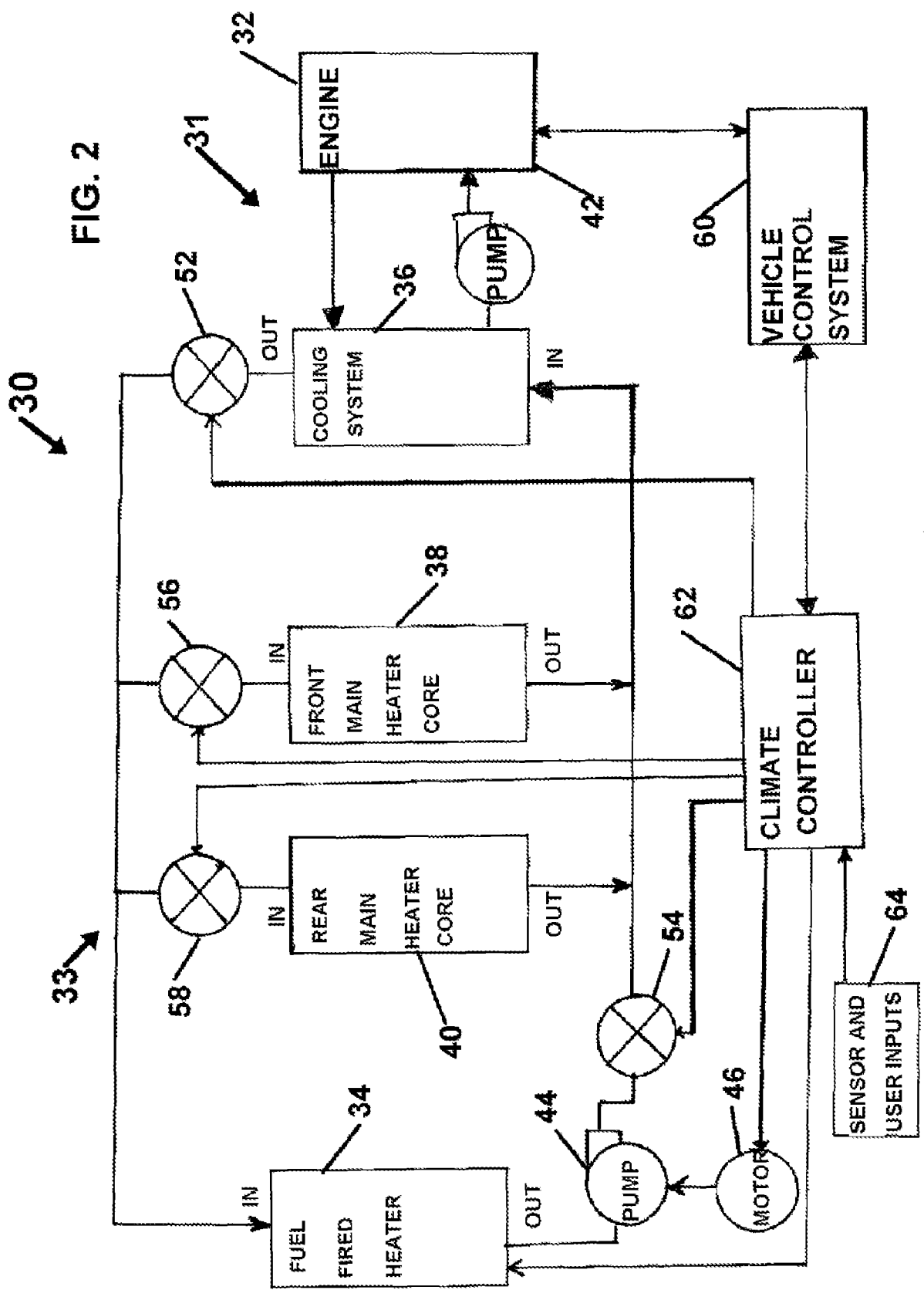
FIG. 2 is a schematic diagram showing the coolant circuit of the present invention.

FIG. 2 schematically illustrates a coolant flow circuit 30 having two major sub-parts, an engine coolant circulation subsystem 31 and a cabin heating subsystem 33. The engine coolant circulation subsystem 31 has as its primary function the extraction of heat from an internal combustion engine 32. In normal operation, excess engine heat is typically sunk to the environment through a radiator (part of cooling system 36), but some of the heat may be diverted to provide heat to cab 12 and sleep compartment 14. The engine coolant circulation subsystem 31 includes an engine driven pump 42 which forces coolant to circulate through the engine and cooling system elements 36. A valve 52 is connected to an outlet to a port from the engine or cooling system elements 36 allowing a portion of the coolant flow to be diverted by pipes to heat exchangers in the vehicle's cabin. Valve 52 is under the control of a climate controller 62.

The auxiliary heat source 20 includes a fuel fired heater 34 and an auxiliary pump 44. Heater 34 provides a burner and a heat exchanger through which engine coolant can be drawn (or forced) for heating. Auxiliary pump 44 delivers coolant under pressure to circulation lines of the coolant flow circuit 30 where it may be selectively routed depending upon current demands for heating, which may include preheat of engine 32 for starting, defrosting demands prior to a cold start, or maintaining cabin heat during an extended period during which engine 32 is not run. A valve 54 is provided at an outlet from the fuel fired heater 34 and pump 44 to prevent the circulation of coolant through the heater and pump under certain circumstances. An electrical motor 46 is provided as the prime mover of auxiliary pump 44. Actuation of the valve 54 (or more properly a solenoid controlling the opening and closing of the valve) and the motor 46 are under the control of climate controller 62.

Located within a passenger cabin are a front main heater 38 and a rear main heater 40. Heater 38 may also be referred to the primary heater or core and the rear main heater 40 may be referred to as a sleeper compartment or auxiliary heater core. The flow of coolant through heater cores 38 and 40 is controlled by the opening and closing of valves 56 and 58, respectively, under the control of climate controller 62. It may be observed here that the primary and auxiliary heaters 38, 40, are supplied with coolant from either the engine cooling subsystem 31 or by the fuel fired heater 34. While to be supplied with coolant from either source requires opening of implicated valve 56 or 58, the cores 38, 40 are never supplied concurrently from both sources of heated coolant. When supplied with coolant from the engine cooling subsystem 31 the flow of coolant is from the IN ports to the OUT ports of cores 38, 40. When supplied with coolant from the fuel fired heater 34 the flow of coolant passes into the heaters 38, 40 from the outlet ports to the inlet ports (reverse flow).

A climate controller 62, illustrated here as connected to the various valves and to auxiliary motor 46 for the control thereof, controls the operation of pump 44 (by control of motor 46), the supply of fuel to fuel fired heater 34 (which may implicate more general vehicle control functions 60 if operation of a fuel pump is required), and the opening or closing of valves 52, 54, 56 and 58. Climate controller 62 operates in response to user requests for heat for any purpose, such as windshield defrosting or sleep compartment heating and potentially the temperature selected for such heating. Climate controller 62 also operates responsively to sensor inputs, such as a passenger compartment temperature sensor (included in package 64). Additionally the climate controller operates responsively to data received from a vehicle control system 60, which includes engine 32 operating status (the climate controller needs to know if pump 42 is running) and coolant temperature. While the connections from the climate controller 62 to the various controlled elements is shown as being direct, it may occur through other control system agencies. In other words, the control functions depicted are functional rather than directly reflective of the precise control architecture. For example, climate controller 62 may be a program running on a general purpose vehicle body computer.

The possible configurations of the coolant flow circuit 30 are set by which of valves 52, 54, 56 and 58 are open or closed. The selection of which valves are open or closed (or modulated between the two states or set in a partially open state) is determined to some extent on the operating state of the heat sources 32, 34. Four states are contemplated: (1) auxiliary heater 34 running and providing heat to pre-heat the main engine 32 which is off; (2) main engine 32 off with auxiliary heater 34 running to provide cabin heat; (3) main engine 32 and auxiliary heater 34 both running; and (4) main engine 32 on and auxiliary heater 34 off.

In state (1) the various valves are set to cut off flow to the main and auxiliary cabin heating cores 38, 40 but to allow circulation through the engine cooling sub-system 31. In state (2) the valves 56, 58 controlling flow to the cabin heater cores 38, 40 are "modulated", that is cycled between opened and closed position, potentially in an alternating manner, to provide flow through the auxiliary and main heater cores to maintain the desired temperature in the passenger cabin. In some embodiments the valve 56 for the main heater core 38 may simply be closed and temperature control implemented through the auxiliary core. The valve 52 controlling flow through the engine cooling path is also modulated to maintain engine temperature at a minimum threshold. Coolant is reverse circulated through the cores 38, 40. In state (3) the engine 32 is on but coolant temperature is measured to be below a desired minimum threshold, and as a consequence the auxiliary heater 34 remains on. Here valve 52 is closed to isolate the engine cooling circuit 31 from the cabin heating circuit 33 and the auxiliary heater 34 provides all the heat available for the front and rear auxiliary cores 38, 40. Isolation of the two sub-circuits from one another prevents the engine coolant pump 42 from damaging the auxiliary pump 44, both of which will be running. Coolant is reverse circulated through the cores. In state (4) the engine 32 is on and coolant temperature in the engine coolant system sub-circuit 31 is sufficiently high to support heating of the cabin. The valve 54 at the outlet from the fuel fired auxiliary heater 34 is closed and the valves 56, 58 to the front and auxiliary cores 38, 40 modulated as required by temperature settings. A default state (5) may be inferred in which the engine 32 is off and the auxiliary heater 34 is off. It is conceivable here that the auxiliary pump 44 may be operated and the valves set to promote flushing or cleaning of the circulation system without operation of the engine 32.

The present invention is by no means limited to the five states described, and in concept is extendable to an extended cab which provides zone heating (that is to say, has a plurality of auxiliary cores). The owner of vehicles can, within limits of conflicting pump operation, determine the flow of coolant. Defrosting operations can be completed before starting a vehicle, saving idle time.

While a presently preferred embodiment of the invention has been illustrated and described, it should be appreciated that principles of the invention apply to all embodiments falling within the scope of the following claims.

What is claimed is:

1. A motor vehicle comprising:
   an internal combustion engine;
   an engine cooling system for the internal combustion engine including a pump for circulating coolant through the internal combustion engine;
   an auxiliary coolant heater including an auxiliary pump;
   a passenger cabin;
   a primary heat exchanger having an inlet port and an outlet port, the primary heat exchanger being installed with respect to the passenger cabin to release heat into the passenger cabin;
   an auxiliary heat exchanger having an inlet port and an outlet port, the auxiliary heat exchanger being installed with respect to the passenger cabin to release heat into the passenger cabin;
   a coolant circulating circuit including the engine cooling system, the auxiliary coolant heater, and connected by the respective inlet and outlet ports to the primary heat exchanger and the auxiliary heat exchanger;
   the coolant circulating circuit further including an engine cooling system outlet control valve, a primary heat exchanger flow control valve, an auxiliary heat exchanger flow control valve and an auxiliary heater flow control valve, the engine cooling system outlet control valve providing for selectively isolating the engine cooling system within and interconnecting the engine cooling system to the coolant circulating circuit, and the primary heat exchanger flow control valve, the auxiliary heat exchanger flow control valve and the auxiliary heater flow control valve providing for cutting off and allowing the flow of coolant through the primary heat exchanger, the auxiliary heat exchanger and the auxiliary heater, respectively;
   the engine cooling system operating when interconnected to the coolant circulating circuit for delivering coolant to the primary heat exchanger flow control valve and the auxiliary heat exchanger flow control valve for allowing flow through the heat exchangers by way of the inlet ports to the outlet ports;
   the auxiliary pump being connected to the coolant circulating circuit and operable for pumping coolant to deliver coolant to the primary heat exchanger or the auxiliary heat exchanger at the respective outlet ports for reverse flow through the heat exchangers to the inlet ports;
   a climate controller coupled to open, close and modulate the engine cooling system outlet control valve, the primary heat exchanger flow control valve, the auxiliary heat exchanger flow control valve and the auxiliary heater flow control valve in response to selection of one of a plurality of operating states; and
   the plurality of operating states including a first state where the auxiliary heater is on with the auxiliary pump running and the internal combustion engine is off to circulate coolant through the engine cooling system, a second state where the engine is off and the auxiliary heater is on to circulate coolant through either or both of the primary and auxiliary heat exchangers, a third state where the internal combustion engine and the auxiliary heater are concurrently running and in which the engine cooling system outlet control valve is closed to isolate the engine cooling system, and a fourth state where the internal combustion engine is on and the auxiliary heater is off.

2. A motor vehicle in accord with claim 1, further comprising:
   input sources connected for communication to the climate controller indicating engine operational state and coolant temperature;
   operator inputs connected for communication to the climate controller for selecting cabin heating functions including defrosting; and
   the climate controller being responsive to the input sources and the operator inputs for determining the operating state of the coolant circulation circuit and being further responsive to the determined operating state for selecting opened and closed states for each of the engine cooling system outlet control valve, the primary heat exchanger flow control valve, the auxiliary heat exchanger flow control valve and the auxiliary heater flow control valve.

3. A motor vehicle in accord with claim 2, further comprising:
   in the first state opening the engine cooling system outlet control valve to allow coolant flow through the engine cooling system, closing the primary heat exchanger flow control valve, closing the auxiliary heat exchanger flow control valve and opening the auxiliary heater flow control valve.

4. A motor vehicle in accord with claim 2, further comprising:
   in the second state modulating the engine cooling system outlet control valve to periodically allow coolant flow through the engine cooling system, closing the primary heat exchanger flow control valve, opening the auxiliary heat exchanger flow control valve and opening the auxiliary heater flow control valve for reverse flow of coolant through the primary and auxiliary heat exchangers.

5. A motor vehicle in accord with claim 2, further comprising:
   in the third state closing the engine cooling system outlet control valve and isolating the engine cooling system, opening or modulating the primary heat exchanger flow control valve for reverse flow, opening or modulating the auxiliary heat exchanger flow control valve for reverse flow of coolant through the primary and auxiliary heat exchangers and opening the auxiliary heater flow control valve.

6. A motor vehicle in accord with claim 2, further comprising:
   in the fourth state opening the engine cooling system outlet control valve to allow coolant flow through the engine cooling system, opening or modulating the primary heat exchanger flow control valve, opening or modulating the auxiliary heat exchanger flow control valve and closing the auxiliary heater flow control valve.

7. A coolant circulation circuit for climate control and preheat comprising:
   coolant for circulating;
   a primary heat source for coolant having a primary pump and an internal coolant circulation subcircuit;
   an auxiliary coolant heater including an auxiliary pump;
   a primary heat exchanger for sinking heat from circulating coolant;
   an auxiliary heat exchanger for sinking heat from the circulating coolant;
   connections between the internal coolant circulation sub-circuit and the primary heat exchanger, the auxiliary heat exchanger and the auxiliary coolant heater;
   an outlet control valve for the internal coolant circulation sub-circuit, a primary heat exchanger flow control valve, an auxiliary heat exchanger flow control valve and an auxiliary heater flow control valve, the outlet control valve allowing for isolation of the internal coolant circulation sub-circuit;
   the primary heat exchanger flow control valve, the auxiliary heat exchanger flow control valve and the auxiliary heater flow control valve providing for cutting off and allowing the flow of coolant through any one or more of the primary heat exchanger, the auxiliary heat exchanger or the auxiliary heater, respectively;
   a controller coupled to open, close and modulate the outlet control valve, the primary heat exchanger flow control valve, the auxiliary heat exchanger flow control valve and the auxiliary heater flow control valve to control flow through the primary heat exchanger and auxiliary heat exchanger including control over the direction of flow of circulating coolant through the primary heat exchanger and the auxiliary heat exchanger in response to selection of one of a plurality of operating states; and
   the plurality of operating states including a first state where the auxiliary heater is running and the primary heat source is off, a second state where the primary heat source is off and the auxiliary heater is on, a third state where the primary heat source and the auxiliary heater are concurrently on, and a fourth state in which the primary heat source is on and the auxiliary heater is off.

8. A coolant circulation circuit in accord with claim 7, further comprising:
   input sources connected for communication to the controller indicating a primary pump operational state and coolant temperature;
   operator inputs connected for communication to the controller for selecting among the primary and auxiliary heat exchangers for operation; and
   the controller being responsive to the input sources and the operator inputs for determining the operating state of the coolant circulation circuit and being further responsive to the determined operating state for selecting opened and closed states for each of the outlet control valve, the primary heat exchanger flow control valve, the auxiliary heat exchanger flow control valve and the auxiliary heater flow control valve.

9. A coolant circulation circuit in accord with claim 8, further comprising:
   in the first state opening the outlet control valve, closing the primary heat exchanger flow control valve, closing the auxiliary heat exchanger flow control valve and opening the auxiliary heater flow control valve.

10. A coolant circulation circuit in accord with claim 8, further comprising:
    in the second state modulating the outlet control valve, closing the primary heat exchanger flow control valve, opening the auxiliary heat exchanger flow control valve and opening the auxiliary heater flow control valve with reversal of flow of the circulating coolant.

11. A coolant circulation circuit accord with claim 8, further comprising:
    in the third state closing the outlet control valve and isolating the engine cooling system, opening or modulating the primary heat exchanger flow control valve for reverse flow, opening or modulating the auxiliary heat exchanger flow control valve for reverse flow of the circulating coolant and opening the auxiliary heater flow control valve.

12. A motor vehicle in accord with claim 8, further comprising:
    in the fourth state opening the outlet control valve to allow circulating coolant flow through the engine cooling system, opening or modulating the primary hear exchanger flow control valve, opening or modulating the auxiliary heat exchanger flow control valve and closing the auxiliary heater flow control valve.

* * * * *